J. G. HEASLET.
SPARK CONTROL IN COMBUSTION ENGINES.
APPLICATION FILED AUG. 13, 1915.
1,239,689.
Patented Sept. 11, 1917.
4 SHEETS—SHEET 1.
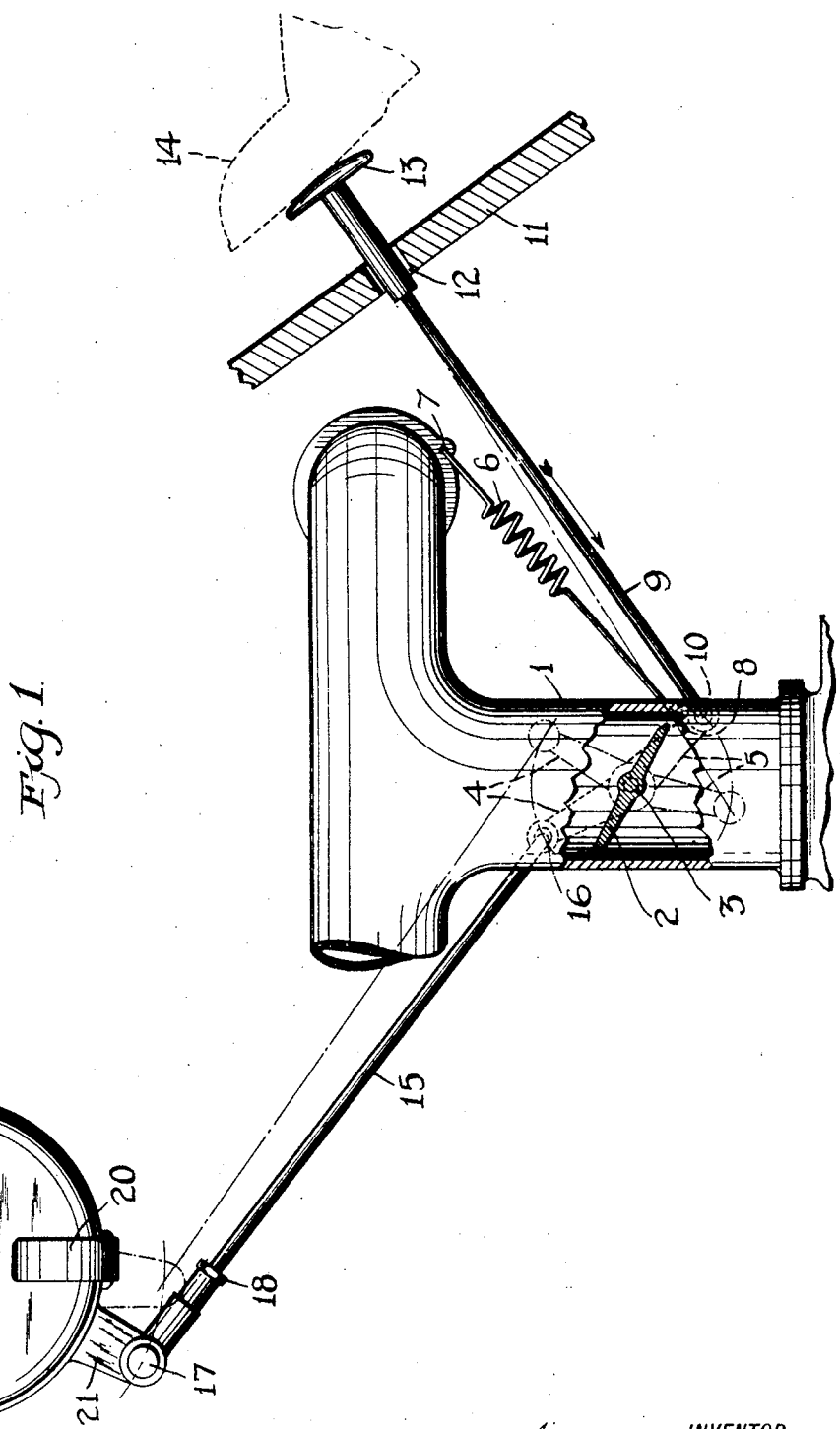

J. G. HEASLET.
SPARK CONTROL IN COMBUSTION ENGINES.
APPLICATION FILED AUG. 13, 1915.
1,239,689.
Patented Sept. 11, 1917.
4 SHEETS—SHEET 2.
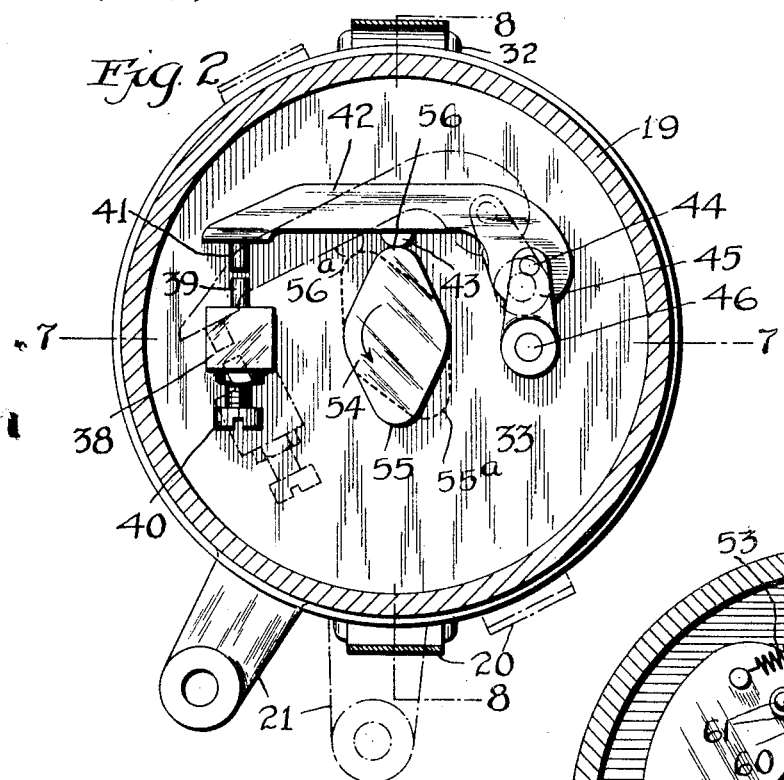
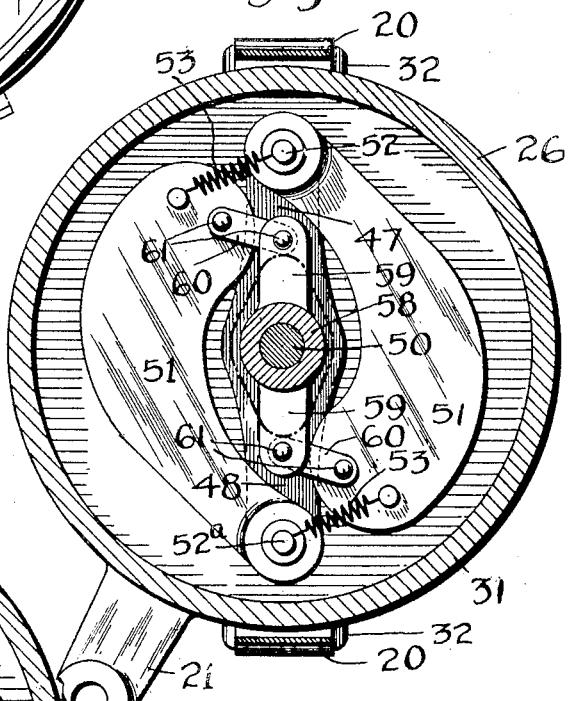
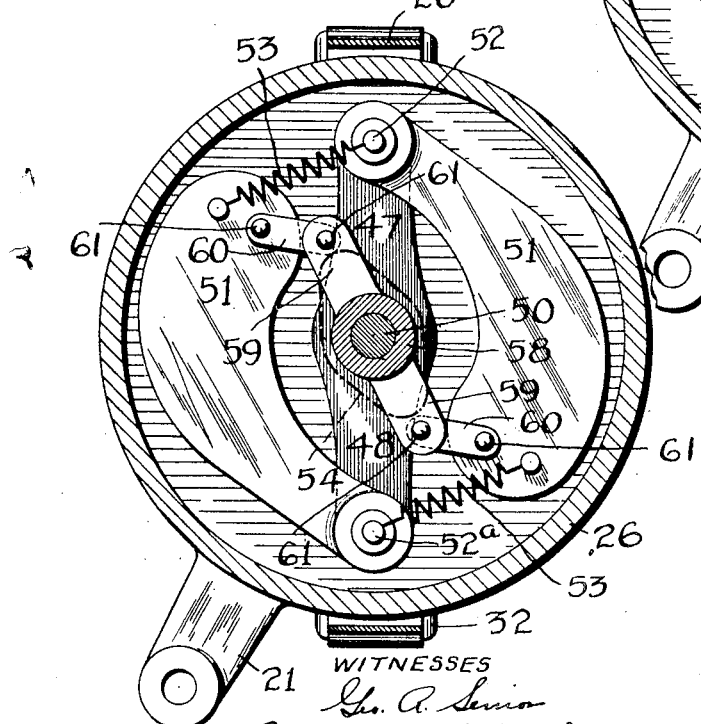
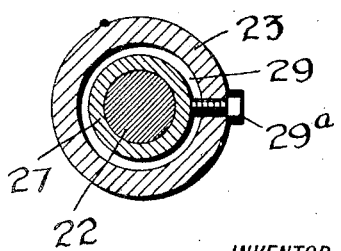
INVENTOR
James G. Heaslet
BY
ATTORNEY
WITNESSES J. G. HEASLET.
SPARK CONTROL IN COMBUSTION ENGINES.
APPLICATION FILED AUG. 13, 1915.
1,239,689.
Patented Sept. 11, 1917.
4 SHEETS—SHEET 3.
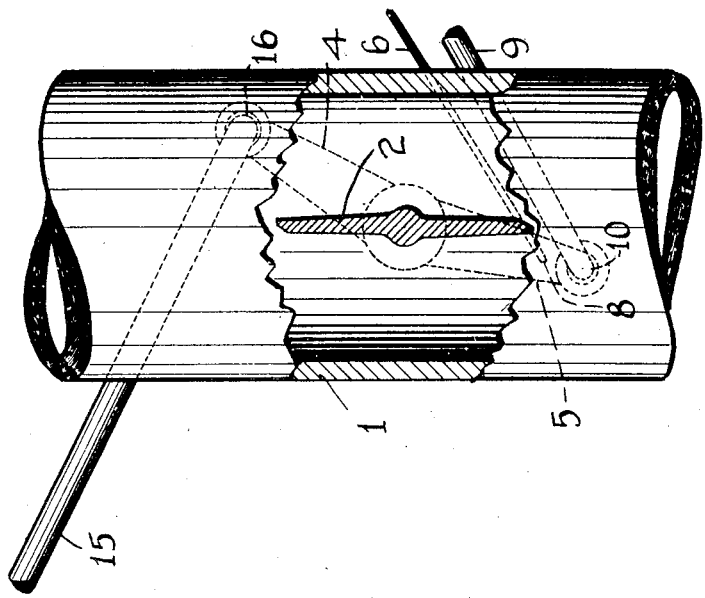
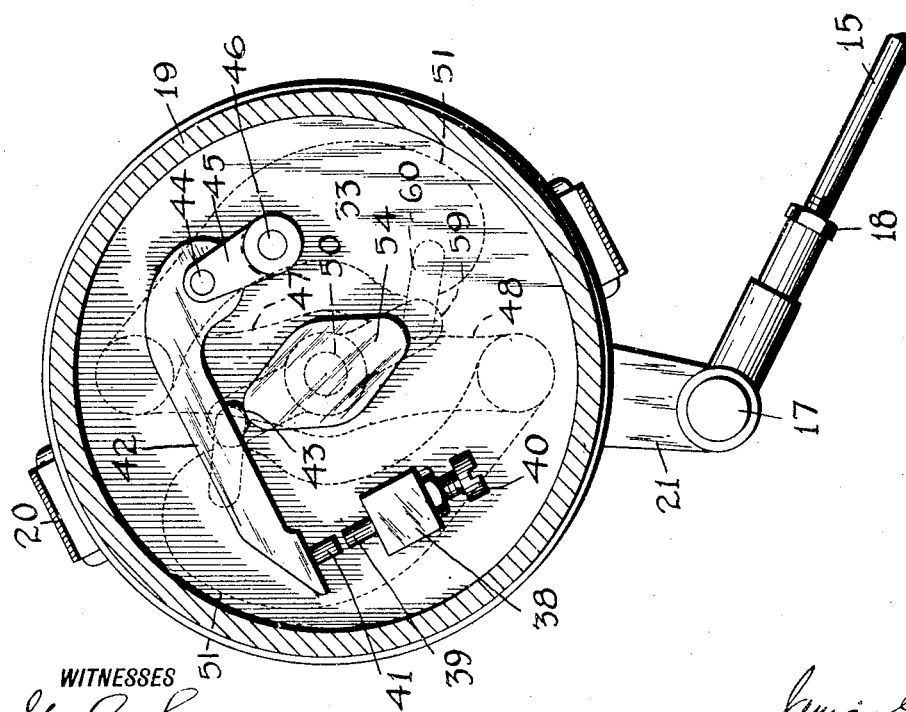
WITNESSES
Geo. A. Simon
Margaret Vogel
INVENTOR
James G. Heaslet
BY
Stewart Perry
ATTORNEY

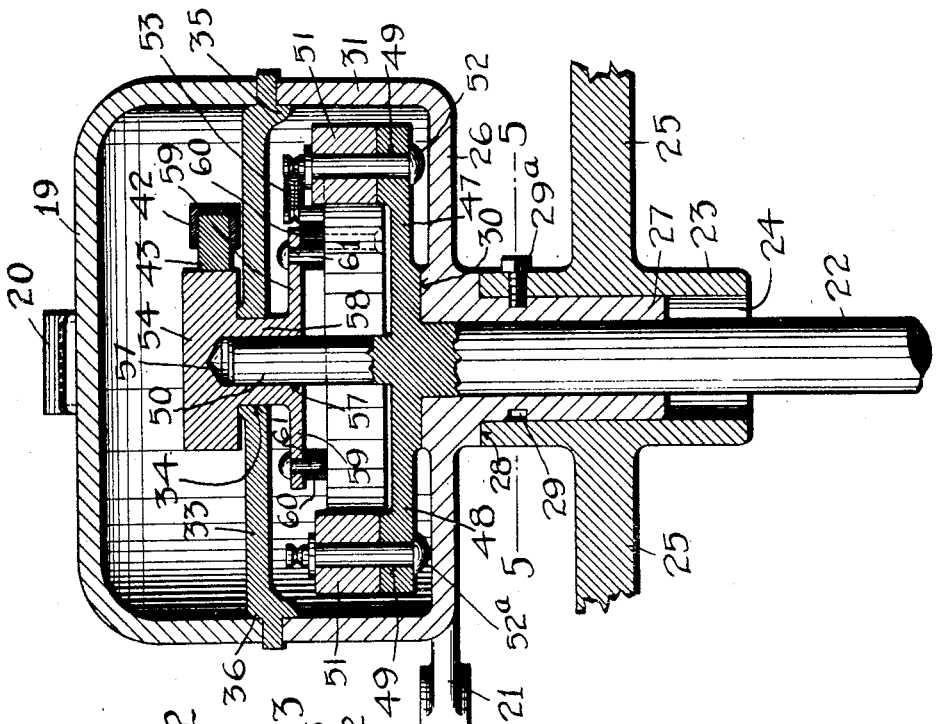
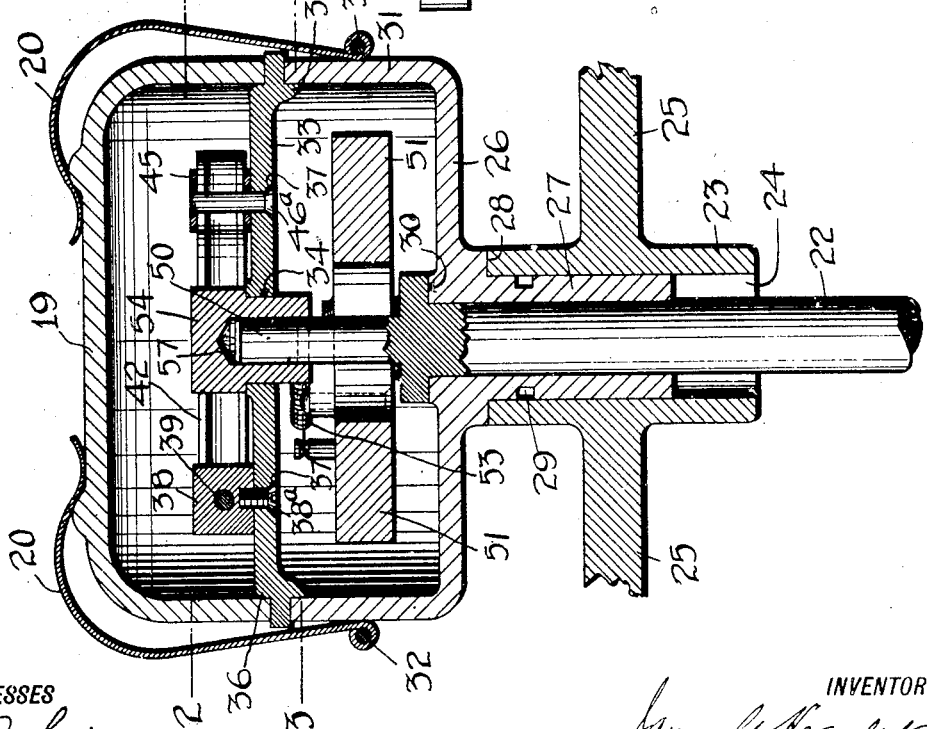

UNITED STATES PATENT OFFICE.

JAMES G. HEASLET, OF DETROIT, MICHIGAN, ASSIGNOR TO THE STUDEBAKER CORPORATION, A CORPORATION OF NEW JERSEY.

SPARK CONTROL IN COMBUSTION-ENGINES.

1,239,689.  Specification of Letters Patent.  Patented Sept. 11, 1917.

Application filed August 13, 1915. Serial No. 45,290.

*To all whom it may concern:*

Be it known that I, JAMES G. HEASLET, a citizen of the United States of America, and resident of Detroit, in the county of Wayne and State of Michigan, have invented certain new and useful Improvements in Spark Controls in Combustion-Engines, of which the following is a specification.

This invention relates to an improvement in means for controlling the throttle and spark-producing means in the operation of internal combustion engines.

In the operation of such engines, it is desirable, under certain conditions of load and speed and fuel supply to advance the spark so as to cause an explosion of gas in anticipation of the completion of the piston stroke. This is accomplished manually, usually by the hand or foot of the operator, resulting in the displacement of what is known as the "timer" from a zero position where the spark is generated at or adjacent to the full thrust of the piston, to a position where its contact with the controller operates to produce the spark at a point before the piston completes its stroke. The same result is also accomplished by automatic means, dependent upon the speed at which the motor is rotating, such apparatus being adjusted to advance the spark in proportion to the increase of motor speed.

Such spark-controlling devices are usually adjusted and operated most efficiently under conditions where a limited volume of gas and air sufficient for normal road conditions is supplied to the motor. I have observed, however, that when a greater volume is supplied to the motor than the limited volume above referred to, to meet abnormal road conditions and where the spark is still advanced, the resultant phenomena is a pounding of the engine, due to conditions which are well understood in the operation of such motors. Such pounding can, however, be avoided by retarding the spark in anticipation of, or at the time, that a greater volume of gas is supplied to the motor, but, in order to accomplish such retardation of the spark with the increase of gas volume, it is necessary (or it has heretofore been necessary) to change the adjustment of the spark-controlling means, be the same manual or automatic, such change necessitating the readjustment of the spark-control when the volume of gas supplied is again restored to the normal minimum volume.

The object of my invention is to provide means, operating in unison with throttle mechanism, whereby the spark controlling mechanism will be subject to throttle control mechanism, when and after the throttle is opened to supply combustible fluid to the motor in excess of a predetermined volume, without however disturbing the setting or adjustment of either manual or automatic spark controlling means employed when a less volume than that referred to is admitted to the motor. My object being to retard the spark when an abnormal volume of gas is supplied to the motor to meet conditions of engine load, and to restore the spark to its setting under manual, or adjustment under automatic spark control, w' en the volume of gas supply is again reduced to a normal and predetermined volume.

I accomplish these results as follows:—
Sparking mechanisms comprise two elements, a timer and a spark controller, mounted in such relation that the timer engages the spark controller in the course of its revolution, thus causing the breaking of the circuit and the resultant spark. The timer is adjustably mounted to turn on its axis, and the manual or automatic control above referred to comprises the moving of the timer on such axis and, by so doing, determining the point in the arc of its rotation at which it will engage the controller. Heretofore the controller has been mounted in a stationary position. In the present embodiment of my improvement I mount the controller so that it may be rotated for purposes of adjustment in the same arc as that in which the timer moves, to the end that I may adjust the position of the timer in its relation to the controller, or the position of the controller in its relation to the timer. In the embodiment of my invention here disclosed, I show the timer under automatic control, regulated according to the speed of engine rotation. On the other hand, I place the controller under the control of means operating either by or in unison with the throttle control. It will be obvious, therefore, that it is possible for me, under this construction, to neutralize the operation of either one of these controls by moving the other control in a direction to meet and compensate for the movement of the other member oppositely controlled, without interfering with or changing the adjustment of such control, that is to say, when the timer is advanced to a certain position by the manual or automatic control, and there maintained under predetermined conditions of speed and under conditions when a certain volume of gas is supplied to the motor (it matters not whether such control is mounted to operate either the timer or the circuit controller), it is obvious that if I move the other member in the arc of its movement, in the same direction and to the same extent as the timer has been previously moved, it will neutralize the effect of the movement of the timer and restore the point of their engagement to a zero position and thus retard the spark, the zero position in such case being understood to be the point at which the spark is caused to operate when the piston is at or adjacent to the limit of its thrust.

In the present embodiment of my invention is shown one means by which the results above referred to may be accomplished. I do not, however, intend to limit my claims to the present embodiment, for it will be apparent that other and different means may be employed to accomplish the neutralizing effect above described, provided such means operate to automatically retard the spark at, and after, a predetermined volume of gas is supplied to the motor, such means operating under the control, or operating in unison with the throttle, to cut out or automatically neutralize the effect of the normal spark-controlling means without changing the adjustment of such means.

I have illustrated my invention in the accompanying drawings, wherein Figure 1 is a diagrammatic view, partly in elevation and partly in section, showing a throttle and means to control the same, together with an elevation in plan view, of the device employed by me to accomplish the results above referred to. Fig. 2 is a plan view of the devices shown in section in Fig. 7, the same being taken on the line 2 2, that is to say, with the hood or cap 19 removed. Fig. 3 is a plan view of the devices shown in Fig. 7 on the line through 3, the apparatus in this drawing being shown in a zero or normal position. Fig. 4 is a duplicate of Fig. 3, showing the device in an abnormal position, that is to say, with the arms distended by the operation of centrifugal force. Fig. 5 is a horizontal section of Fig. 8 taken on line 5 5. Fig. 6 is a view of Fig. 2 showing the timer advanced and the controller also advanced to meet the same. This view also shows the throttle fully open. Fig. 7 is a vertical section of Fig. 2 on the line 7 7 with the hood or cap 19 in place. Fig. 8 is a similar vertical section to that of Fig. 7, taken on the line 8 8 of Fig. 2.

1 is a tube through which combustible fluid is supplied to the motor. It contains a butterfly valve, 2, which is mounted on shaft 3, the latter being journaled in the walls of the tube 1. On the opposite side of said tube 1 and secured to the shaft 3, as indicated in dotted lines in Fig. 1, is a bell crank lever having two arms, 4 and 5. 6 is a helicon spring secured at one end, as at 7, to a stationary member, and at the other end to the arm 5 of said bell crank lever at point 8, its tension being directed to hold the valve 2 normally closed. 9 is a rod with one end pivotally connected to the arm 5, and at the other end passing through a hole, 12, in the floor, 11. 13 is a pushbutton and 14 is the illustration of a human foot bearing on the same. 15 is a rod pivotally connected at 16 with the arm 4 of the bell crank lever referred to, and at the other end pivotally connected at 17 with an arm 21, the operation of which will hereafter be described. 18 indicates a screw adjustment by which the throw of the arm 15, in its relation to the arm 21, may be determined and adjusted.

Referring to Figs. 7 and 8, 25 is a suitable support for a sleeve, 23, the latter having a central aperture at 24, and a bearing surface, 28, at the top thereof. 26 is a casing provided with a stem, 27, and a shoulder adapted to rest on the bearing surface 28, said stem being provided with annular groove 29. The stem 27 is keyed to revolve within the sleeve 23 by the screw 29ª. Casing 26 has the bearing surface 30 and annular walls 31.

22 is the shaft mounted to be rotated in unison with motor revolution. It is adapted to be mounted within the stem 27, and is provided with a shoulder to rest on the bearing surface 30 of the casing 26. It is provided with the radial arms 47 and 48, and is further projected into the stem 50.

The springs 20 are attached to the walls of casings 26 at 32 and operate to hold cap 19 in position; interposed between the cap 19 and the walls 31 of the casing 26 is a partition or plate 33 having a central aperture 34 and screw holes 37, and an annular boss 35, to receive the walls 31 of the casing 26, and an annular boss 36 to receive the walls of the cap 19. 38ª and 46ª are screws adapted to secure the circuit controller in position on the plate 33.

Referring to Fig. 2, I there illustrate a timer and a circuit controller, the latter comprising the following elements: 38, is a post screwed to the plate 33 by the screw 38ª and carrying the electric contact point 39, which is adjustable by set screw 40 in its relation with the electric contact point 41. 42 is an arm carrying the electric contact point 41, and also the physical contact point 43, which is adapted to engage either end of the timer 54. Arm 42 is pivoted at 44 to the link 45, which in turn is secured in a fixed position to the plate 33 by the screw 46ª.

Referring to Figs. 3, 4, 7 and 8, 47 and 48 are two arms, preferably integral with the shaft 22, and having their bearing on the surface 30 of the casing 26, the stem 50 rising intermediate said arms on the axis of the shaft 22. 51 and 51 are loaded levers pivotally connected to the arms 47 and 48 by the bolts 52 and 52ª respectively. 53 and 53 are helical springs interposed between the ends of said levers and the bolts last referred to, having their tension directed to hold said weighted levers in the position shown in Fig. 3, whereas, under the exercise of centrifugal force they are thrown into the position shown on Fig. 4. 54, shown in full lines in the Fig. 2 is a timer, oval in form, the ends 55 and 56 mounted to engage the contact point 43 of the circuit controller. This timer is shown in dotted lines in Fig. 3, in its normal or zero position, and in dotted lines in Figs. 2 and 4 in its abnormal position, that is to say, when in its operation the spark is advanced. The timer 54 is internally bored, as at 57, such bore being adapted to receive the stem 50, and it is mounted within the aperture 34 in the plate 33. 58 I characterize as the neck of the timer, from which radiate two arms, 59—59. 60 and 60 are links interposed between the respective ends of the arms 59 and the weighted levers 51, such pivotal connection being accomplished by the bolts 61.

The operation of this device is as follows: Assuming that the automatic spark control, the operation of which will be presently described, is set to operate in conformity with a predetermined rate of motor revolution and under conditions where a predetermined volume of gas is supplied to the motor, these conditions satisfying the normal requirements of usage in the operation of automobiles, resulting in the satisfactory operation of the motor under normal conditions of load. (The operation of the device under abnormal conditions of load will be dealt with presently.) Under the normal conditions of load above referred to, the valve 2 is so adjusted that the movement of the valve by the pressure of the foot 14 on the button 13 will not operate to move the rod 15 until the valve is moved on its axis to points substantially as indicated in Fig. 1. In this position it will be noted that the valve is open and that a certain volume of gas, measured by the extent of such opening, is permitted to flow to the motor, this I characterize as a predetermined volume capable of being measured and regulated. The relation of such volume to the devices herein described is regulated according to the length of the stem 15 as controlled by the set screw 18. During the period that this predetermined volume of gas is flowing to the motor, the automatic control as herein described, or the manual control if such be employed, is undisturbed by the operation of mechanism presently to be described. Hence it may be said that during a period when a predetermined volume of gas is flowing into the motor, that is to say, a volume governed by the position of the valve 2, the motor is entirely in the control of the spark regulating means as at present employed and as well understood in the art. This operation is maintained during normal road conditions, as, for instance, where the machine is traveling over a level or approximately level road, thus presenting a uniform or approximately uniform load to the operation of the motor. Under these conditions, the spark may be, and usually is, advanced a predetermined degree, as the best results are obtained under such conditions.

The automatic spark control above described operates as follows: The shaft 22 is geared to operate in conformity with motor speed, and such operation causes the arms 47 and 48 to revolve about the axis of the shaft 22, of which they form a part. The weighted levers 51 and 51 are respectively pivoted at the ends of the arms 47 and 48 and bound thereto by the springs 53—53. The timer 54 is mounted on the stem 50 and its arms 59—59 are secured to the weighted levers by the links 60—60. Under normal conditions, when the engine is running slow, the elements last described are found in the position shown in Figs. 2 and 3. Under such conditions the timer 54 makes contact with the controller knob 43 at predetermined intervals in the course of its rotation, the adjustment being such as to produce a spark in the cylinder at a time when the piston is at or adjacent to its full thrust, this I characterize as the "zero position". However, as the speed of the rotation of the engine increases, the weighted levers 51, because of the power of centrifugal force exercised upon them, are distended against the tension of the spring 53 into or adjacent to the position shown in Fig. 4, thus operating to turn the timer 54 on its axis and bring the same, say, into the position shown in dotted lines in Figs. 2 and 4 and in full lines in Fig. 6. The operation of the timer under these conditions is to cause the spark to be produced in the cylinder in advance of the piston accomplishing its full stroke, such relation being generally characterized as an "advance spark". The device just described is one of many forms of automatic spark control. The manual controller consists of any means operated manually to turn the timer 54 in like manner at the will of the operator.

Under the conditions which I have described, it is intended that the automatic control just described shall operate during the period that the throttle is in a position to deliver to the engine a predetermined volume of gas, as, for instance under conditions similar to those which I have graphically illustrated in Fig. 1, where the valve is shown partly open.

Suppose, now, an abnormal load is opposed to the operation of the engine, such, for instance, as an unusual grade, a sandy road or the like. Under these conditions, it is desirable, and in many cases necessary, to supply the engine with a greater volume of gas. As previously stated, if this greater supply of gas is fed to the engine while the spark is materially advanced, the engine begins to pound, due to well known phenomena not necessary here to enumerate, thereby losing efficiency and endangering the life of the motor. It is necessary, therefore, to immediately retard the spark, this can be done under conditions of manual control by turning the timer to zero, and, under conditions of automatic control, by slowing down the speed of the motor. Both of these operations are objectionable, for the reason that in the case of the manual control when the supply of gas again becomes normal, it becomes necessary to go through the operation of readjusting the spark to normal conditions, which requires skill and attention. Where automatic control is employed, it is undesirable, and sometimes impracticable, to slow down for the purpose of meeting the conditions described. Therefore, it becomes of the first importance to find means by which the spark may be retarded without interfering with such adjustments. I will now describe the manner in which I accomplish this result: Further pressure on the button 13 causes the valve to open to supply a volume of gas in excess of that supplied under normal conditions, and, as the valve 2 is opened by the pressure of the foot, the bell crank lever 4 is moved in the arc of the circle indicated in dotted lines in Fig. 1 and operates to move the rod 15 in the direction of the movement of the bell crank lever 4, and, in so doing, moves the arm 24 carrying with it the casing 26, which is mounted on the stem 27 to revolve in the sleeve 23, carrying with it plate 33 and the circuit controlling mechanism represented by the contact point 43 and electric contact points 39 and 41, all of which, as heretofore stated, are mounted on plate 33. This change of position is indicated in dotted lines in Fig. 2 and full lines in Fig. 6, where it will appear that, notwithstanding the fact that the timer 54 has been moved into a position to advance the spark, as shown in dotted lines Figs. 2 and 4, the fact that contact point 43 and its accompanying members have been moved in the arc of their mounting in the same direction (as shown in dotted lines Fig. 2 and full lines Fig. 6), operates to bring the point of engagement between them to the zero position from whence they started, and hence operates to neutralize the effect of the movement of the timer 54, thus retarding the spark during the period that the valve 2 is opened to admit a volume of gas in excess of that predetermined volume under which the automatic control is adjusted to operate, i. e. under normal conditions. When, however, the pressure of the foot is relieved from button 13 sufficiently to permit the valve 2 to be restored to its normal position in the power of the spring 6, casing 26, carrying the controller and the contact point 43 is again restored to its normal position, thus again advancing the spark to the position which it occupied prior to the opening of the throttle for the purpose of supplying an abnormal volume of gas.

Hence it will be apparent that the objects that I have in view, as heretofore stated, are accomplished by interposing a secondary spark control operating in unison with throttle control and adapted to neutralize the effect of a primary throttle control when a predetermined volume of gas is supplied to the motor, such volume being in excess of the volume employed during the operation of the primary spark controlling means.

What I claim is:

1. In an internal combustion engine, a throttle, and sparking mechanism, in combination with means operable by the throttle, only after the latter is opened beyond a predetermined extent, to control the sparking mechanism.

2. In an internal combustion engine, a throttle, and sparking mechanism, in combination with means operable by the throttle, only after the latter is opened beyond a predetermined extent, to retard the spark as the throttle is further opened and to subsequently advance the spark as the throttle is returned to the position of said predetermined extent of opening.

3. In an internal combustion engine, a throttle, and sparking mechanism, in combination with means operable by the opening and closing of the throttle for shifting the sparking mechanism to advance or retard the spark, said means being operable to control the sparking mechanism when the throttle is opened in excess of that necessary to supply a predetermined amount of gas to the motor, any operation of the throttle to admit less than said predetermined amount of gas having no effect upon the sparking mechanism.

4. In an internal combustion engine, a throttle, and sparking mechanism, in combination with controlling means operated by the opening and closing of the throttle for controlling the sparking mechanism, said means being operable to control the sparking mechanism when the throttle is opened in excess of a predetermined maximum, under which maximum the operations of the throttle do not control the sparking mechanism.

5. In an internal combustion engine, a throttle, and sparking means, in combination with means, independent of the throttle, to control said sparking means during a period when the gas supply is limited by said throttle to a predetermined volume, with additional means to control said sparking means, the latter operating only when the gas supply exceeds the predetermined volume referred to as the limiting field of operation of the first-mentioned controlling means, the operation of said second controlling means being progressively to retard the spark as the volume of gas increases without interference with any manual or automatic adjustment of the first-mentioned spark controlling means.

6. In an internal combustion engine, a throttle, and sparking means, in combination with manually operable means for simultaneously regulating both the throttle and the sparking means, said manual means being operable to regulate the throttle within a predetermined zone without effecting regulation of the sparking means.

7. In an internal combustion engine, a throttle, and sparking means, in combination with manually operable means for simultaneously regulating both the throttle and the sparking means, said manual means being operable to regulate the throttle within a predetermined zone without effecting regulation of the sparking means, and means for automatically returning the throttle and sparking means to their initial conditions after being operated upon by said manual means.

8. In an internal combustion engine, a throttle, and sparking means, in combination with manually operable means for separately controlling the throttle during a preliminary travel of the throttle, said manual means being also operable, upon a further throw of the throttle thereby, to simultaneously control the sparking means.

9. In an internal combustion engine, a throttle, and sparking means, in combination with manually operable means for separately controlling the throttle during a preliminary travel of the throttle, said means being also operable, upon a further throw of the throttle thereby, to simultaneously operate the sparking means to retard the spark.

10. In an internal combustion engine, a throttle, and sparking means, in combination with manually operable means for separately controlling the throttle during a preliminary travel of the throttle, said means being also operable, upon a further throw of the throttle thereby, to simultaneously operate the sparking means to retard the spark, and means for automatically returning the throttle to its normal position and simultaneously advancing the spark to its initial condition subsequently to the operation of the manually operable means.

11. In an internal combustion engine, a throttle, and sparking means, the latter embodying two coöperating mechanisms, one of which embodies an electric circuit make and break device, and the other of which embodies means for periodically actuating said make and break device, in combination with means operated by the opening and closing of the throttle for shifting one of said mechanisms relative to the other to advance or retard the spark synchronously with any change of adjustment of the throttle beyond a predetermined maximum opening.

12. In an internal combustion engine, a throttle, and sparking means, the latter embodying two coöperating mechanisms, one of which includes an electric circuit make and break device, and the other of which embodies means for periodically actuating said make and break device, in combination with means for shifting the actuating means relative to the make and break device for advancing the spark, and means for subsequently shifting the make and break device relative to the actuating means to bring them into such relative positions as to retard the spark to normal.

13. In an internal combustion engine, a throttle, and sparking means, the latter embodying two coöperating mechanisms, one of which includes an electric circuit make and break device, and the other of which embodies means for periodically actuating said make and break device, in combination with means for automatically shifting the actuating means relative to the make and break device for advancing the spark, and means, operable by the movement of the throttle, for shifting the make and break device relative to the actuating means to bring them into such relative positions as to retard the spark to normal.

14. In an internal combustion engine, a throttle, and sparking means, the latter embodying two coöperating mechanisms, one of which includes an electric circuit make and break device, and the other of which embodies means for periodically actuating said make and break device, in combination with means for shifting the actuating means relative to the make and break device for advancing the spark, and means, operable upon the opening of the throttle beyond a predetermined point, for shifting the make and break device to the position which it initially occupied relative to its actuating means, for the purpose of retarding the spark to the same extent as said spark was advanced by the movement of the actuating means relative to the make and break device.

15. In an internal combustion engine, a throttle, and sparking means, the latter embodying two coöperating mechanisms, one of which includes an electric circuit make and break device, and the other of which embodies means for periodically actuating said make and break device, in combination with means for shifting the actuating means relative to the make and break device for advancing the spark to a predetermined degree, during which operation the throttle may be opened to a predetermined maximum, at will, without having any effect upon the adjustment of the parts, and means operable upon the further opening of the throttle to shift the make and break device, relative to its actuating means, to the position which it initially occupied relative to its actuating means, for the purpose of retarding the spark to the same extent as said spark was advanced by the movement of the actuating means relative to the make and break device.

16. In an internal combustion engine, a throttle, and sparking means, in combination with manually operable means for simultaneously regulating both the throttle and the sparking means, said manually operable means being adapted to be operated at will up to a predetermined maximum degree of opening of the throttle, without effecting regulation of the sparking means, but adapted to retard the sparking means synchronously with the opening of the throttle beyond such predetermined maximum, and means, operating independently of the throttle, for automatically regulating the sparking means at such times as the throttle opening is equal to, or less than, the predetermined maximum opening referred to.

17. In an internal combustion engine, a throttle, and a sparking device comprising two coöperating mechanisms, one of which is rotatable in timed relation with the motor and adapted to actuate the other, which is normally stationary, for the purpose of periodically producing a spark, means for adjusting the position of the rotatable mechanism with reference to the normally stationary mechanism to advance the spark, and means for also advancing the normally stationary mechanism to the same extent as the rotatable mechanism is advanced to compensate for or neutralize the movement of the rotatable mechanism.

18. In an internal combustion engine, a throttle, and a sparking device comprising two coöperating mechanisms, one of which is rotatable in timed relation with the motor and adapted to actuate the other, which is normally stationary, for the purpose of periodically producing a spark, means for adjusting the position of the rotatable mechanism with reference to the normally stationary mechanism to advance the spark, and means for also advancing the normally stationary mechanism to the same extent as the rotatable mechanism is advanced to compensate for or neutralize the movement of the rotatable mechanism, said means for advancing the normally stationary mechanism being dependent for its operation upon the opening of the throttle beyond a predetermined maximum.

19. In a device of the class described, a shaft driven in synchronism with the power shaft of an internal combustion engine, a trip coöperating with said power shaft and rotatable therewith, normally stationary mechanism mounted adjacent the trip and operated thereby to periodically make and break the ignition circuit, means for varying the position of the trip relative to the piston stroke of the engine to advance the spark as the speed of the engine increases, and means for shifting the normally stationary mechanism to retard the spark.

20. In a device of the class described, a shaft driven in synchronism with the power shaft of an internal combustion engine, a trip coöperating with said power shaft and rotatable therewith, normally stationary mechanism mounted adjacent the trip and operated thereby to periodically make and break the ignition circuit, means for varying the position of the trip relative to the piston stroke of the engine to advance the spark as the speed of the engine increases, and means, operable by the throttle, for shifting the normally stationary mechanism to retard the spark.

21. In a device of the class described, a shaft driven in synchronism with the power shaft of an internal combustion engine, a trip coöperating with said power shaft and rotatable therewith, normally stationary mechanism mounted adjacent the trip and operated thereby to periodically make and break the ignition circuit, means for varying the position of the trip relative to the piston stroke of the engine to advance the spark as the speed of the engine increases, and means for shifting the normally stationary mechanism, said means being operable by the throttle to retard the spark when said throttle is opened in excess of a predetermined maximum.

22. In a device of the class described, a shaft driven in synchronism with the power shaft of an internal combustion engine, a trip coöperating with said power shaft and rotatable therewith, normally stationary mechanism mounted adjacent the trip and operated thereby to periodically make and break the ignition circuit, means for varying the position of the trip relative to the piston stroke of the engine to advance the spark as the speed of the engine increases, and means for shifting the normally stationary mechanism, said means being operable by the throttle to retard the spark when said throttle is opened in excess of a predetermined maximum, any operation of the throttle, when the same is opened less than the predetermined maximum, having no effect on the spark control.

23. In an internal combustion engine, a throttle, and sparking means, the latter embodying two coöperating mechanisms, one of which includes an electric circuit make and break device, and the other of which embodies means for periodically actuating said make and break device, in combination with means for shifting the actuating means relative to the make and break device for advancing the spark, and means for subsequently shifting the make and break device relative to the actuating means to bring them into such relative positions as to retard the spark.

24. In an internal combustion engine, a throttle, and sparking means, the latter embodying two coöperating mechanisms, one of which includes an electric circuit make and break device, and the other of which embodies means for periodically actuating said make and break device, in combination with means for automatically shifting the actuating means relative to the make and break device for advancing the spark, and means, operable by the movement of the throttle, for shifting the make and break device relative to the actuating means to bring them into such relative positions as to retard the spark.

25. In a device of the class described, a shaft driven in synchronism with the power shaft of an internal combustion engine, a trip coöperating with said power shaft and rotatable therewith, normally stationary mechanism mounted adjacent the trip and operated thereby to periodically make and break the ignition circuit, means for varying the position of the trip relative to the piston stroke of the engine to advance the spark as the speed of the engine increases, manually controlled means for shifting the normally stationary mechanism to retard or advance the spark, and a throttle operable by said manually controlled means, said means being operable to open the throttle to a predetermined extent before shifting the normally stationary mechanism.

26. In a device of the class described, a shaft driven in synchronism with the power shaft of an internal combustion engine, a trip coöperating with said power shaft and rotatable therewith, normally stationary mechanism mounted adjacent the trip and operated thereby to periodically make and break the ignition circuit, means for varying the position of the trip relative to the piston stroke of the engine to advance the spark as the speed of the engine increases, manually controlled means for shifting the normally stationary mechanism to retard or advance the spark, a throttle operable by said manually controlled means, said means being operable to open the throttle to a predetermined extent before shifting the normally stationary mechanism, and means for automatically returning the stationary mechanism and manually controlled means to their normal conditions subsequently to the manual operation thereof.

27. In an internal combustion engine, a throttle, and sparking means embodying two elements, one of which is controlled by a governor, and the other of which is independent of the throttle up to the point of supplying a predetermined amount of gas to the engine, and controlled by the throttle only when said throttle is opened to supply an additional amount of gas to the engine.

28. In an internal combustion engine, a throttle, and sparking means embodying two coöperating mechanisms, one of which is controlled by the speed of the engine to automatically advance the spark with an increase in engine speed, and the other of which is controlled by the throttle after the throttle is opened beyond a predetermined maximum to neutralize the advance of the spark by the former mechanism, said throttle operating within the predetermined maximum independently of the sparking means.

29. In an internal combustion engine, a throttle, and sparking means embodying two mechanisms, one of which is controlled by a centrifugal governor to advance the spark with an advance in engine speed, and the other of which is controlled by the throttle only after said throttle is opened beyond a predetermined extent to neutralize the advance of the spark by the first mechanism.

Signed by inventor at Detroit, Michigan this 10th day of August 1915.

JAMES G. HEASLET.

Witnesses:
Roy C. Gamble,
D. G. Mastick.